INVENTOR
PETAR PALIC

April 2, 1963   P. PALIC   3,084,011
MAGNETIC RECORDING OF MEASURING PROCESSES
Filed Jan. 6, 1960   2 Sheets-Sheet 2

INVENTOR
PETAR PALIC
BY
AGENT

3,084,011
MAGNETIC RECORDING OF MEASURING PROCESSES
Petar Palic, Hamburg-Lockstedt, Germany, assignor to North American Philips Company, Inc., New York, N.Y., a corporation of Delaware
Filed Jan. 6, 1960, Ser. No. 882
Claims priority, application Germany Feb. 18, 1959
1 Claim. (Cl. 346—33)

In recording measuring processes which last a long time and which involve for instance, an electrical conversion of mechanical magnitudes into electrical value, it is found to be a drawback that a recording must be correlated immediately with the measuring process, particularly in those cases in which fairly long measuring periods occur between the checked measuring time periods, while the recorded measuring magnitudes do not vary or the contents thereof are not essential for the recording. It was therefore self-evident to utilize a magnetic recording and reproducing apparatus, whose record carrier may be used to store a modulation corresponding to the converted measuring process, which modulation may be reproduced after an arbitrary time and be fed to a recording or writing apparatus or the like.

The invention relates to such an arrangement for recording and reproducing measuring processes converted by means of a carrier frequency while using a magnetic recording and reproducing apparatus, the reproduction being adapted to be recorded. With measuring processes converted by means of a carrier frequency it has now been found that, apart from the modulation product recorded by the record carrier and corresponding to the measuring process to be recorded, a phase reference is required for the carrier frequency in order to record and write correctly the measuring values recorded on the record carrier. This is achieved in accordance with the invention by recording the carrier frequency in a second track on the record carrier the second track recording is performed simultaneously and in the initial phase relationship, apart from the modulation emanating from the carrier-frequency measuring bridge and corresponding to the measuring process.

With carrier-frequency measuring bridges, for example, with measuring methods using extensometers, it is an advantage that recordings be made only for the periods in which load or load fluctuations occur; this provides an economy in material, i.e. recording paper and, moreover, enhances the facility of inspection of the diagrams.

Further advantageous particulars of the invention are described with reference to one embodiment.

Figure 1:
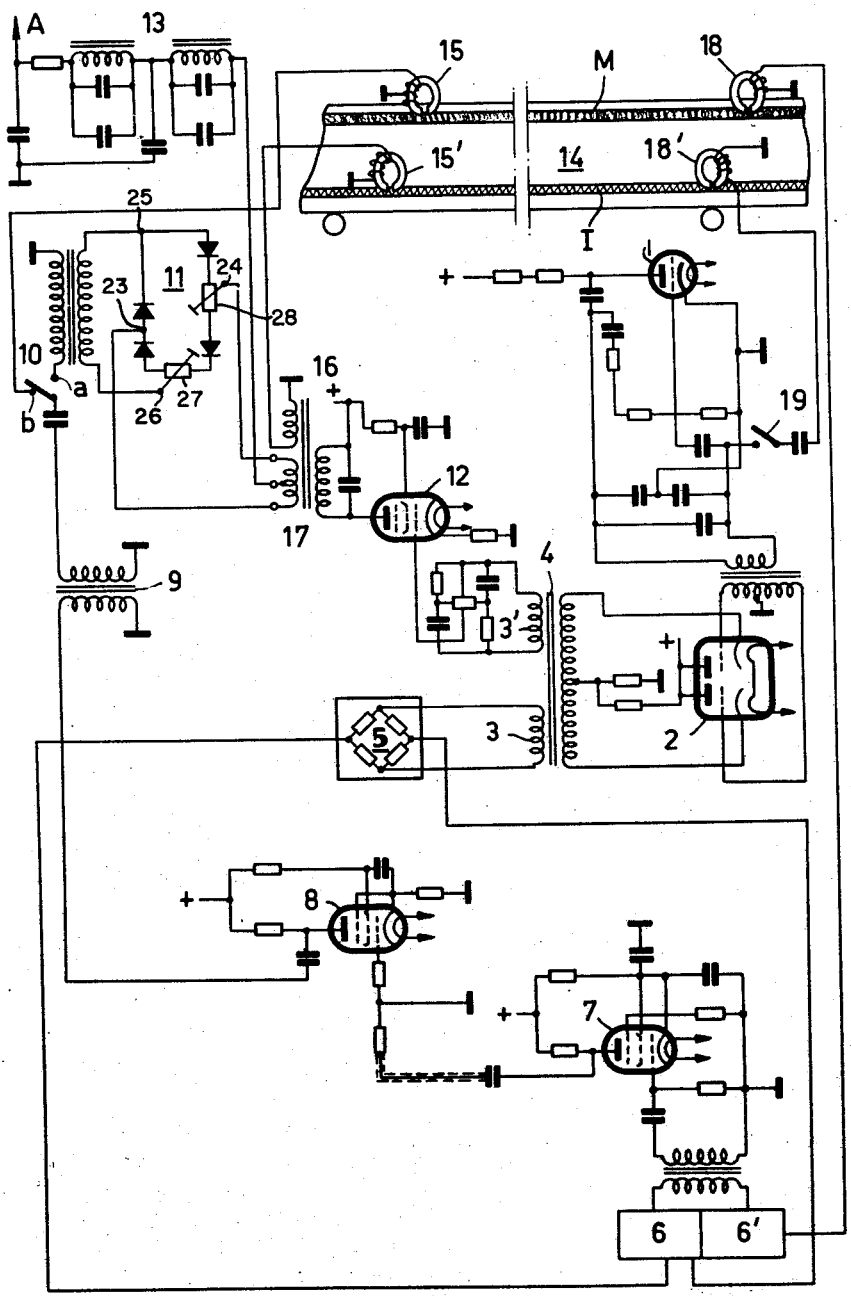
FIG. 1 shows a circuit diagram for recording and reproducing measuring processes by means of a carrier-frequency extenso-bridge circuit.

A carrier-frequency oscillator 1 supplies via an amplifier 2 and the winding 3 of an intermediate transformer 4 a carrier frequency, for example, of a few kc./s. for a bridge 5, for example, an extensometer-bridge, from the output of which the modulated voltage is fed via an input 6 to an amplifier 7, 8. The modulated voltage arrives via the transformer 9 and contact $a$ of a switch 10, at the demodulator 11, to which is simultaneously fed the carrier frequency of the oscillator 1 from the winding 3' of the intermediate transformer 4 via the valve stage 12. The demodulator 11 comprises a bridge circuit arrangement with a rectifier in each leg of the bridge, as shown; the polarity of all the rectifiers is such that they are in series-aiding relationship. The carrier signal is applied at opposite ends 23 and 24 of the bridge, and the modulated signal is applied at the other opposite ends 25 and 26; the potentiometers 27 and 28 are provided for null balancing. Via a filter 13 at A the demodulation product, which corresponds to the measuring process picked up by the bridge 5, can be obtained for recording by means of a writing apparatus, an oscillograph, a compensator or the like.

Figure 2:
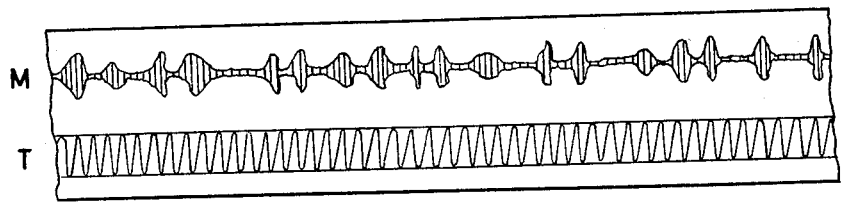
FIG. 2 is a diagrammatic representation of the recordings on the record carrier.

If, however, the measuring process is recorded on a record carrier 14 by means of a double recording head 15, 15', the switch 10 is to be changed over to the contact $b$. Thus the demodulator 11 is switched off. At the same time the record carrier 14 receives from the winding 16 of the transformer 17 the carrier frequency in the same phase relationship as the modulated frequency, so that a double track is formed on the record carrier as is shown in FIG. 2. In this figure T designates the carrier frequency, M the modulated carrier frequency.

The record is taken from the record carrier 14 by means of a double reproducing head 18 and 18' in the following manner:

The modulation frequency to be obtained from the track M is fed to the input 6'. The input 6 is switched off. Via the amplifier 7, 8, the transformer 9 and the contact $a$ of the changed-over switch 10 the modulation frequency arrives at the demodulator 11, as described above, and is available at the output A for recording by means of a writing apparatus or the like.

The carrier frequency recorded in track T serves for synchronizing the oscillator 1, when for the reproduction of the demodulation product at the output A the switch 19 is closed, so that a correct reproduction of the measuring process is possible. For synchronizing the oscillator any known arrangement may be used, one of which is indicated in the embodiment shown. As an alternative, the carrier frequency obtained from the track T may be fed in known manner to the demodulator 11 either directly or via an amplifier, in which case if desired, fixed, phase-shifting members may be included in the conductor path.

The speed of the record carrier is efficaciously adapted to the carrier frequency and the run-off velocity of the writing strip is reduced by a factor with respect to the velocity of the record carrier. For the arrangement described it is not essential whether the storage of the measuring process takes place by means of known magnetizing processes for example of the amplitude-modulation or frequency-modulation recording.

Figure 3:
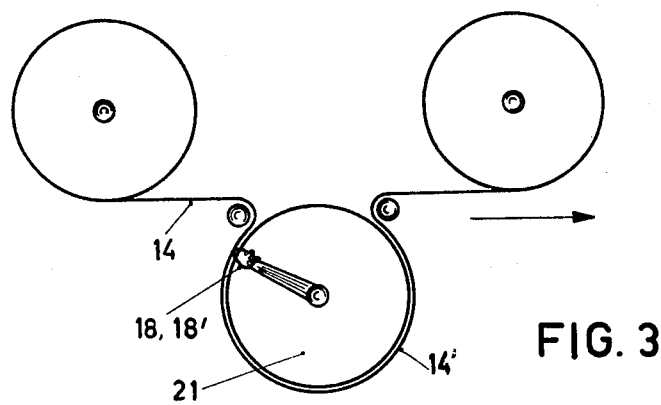
FIG. 3 shows a magnetic recording and reproducing apparatus comprising a loop.
Figure 4:
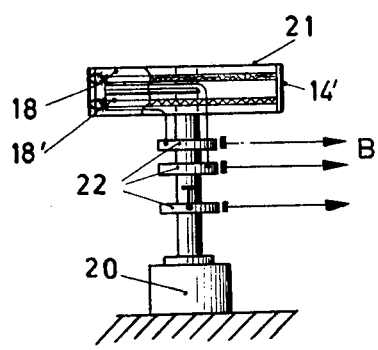
FIG. 4 is a diagrammatical side view of the apparatus shown in FIG. 3.

The record carrier apparatus may also be such that the record carrier forms a stationary loop with an optional portion, as is shown in FIGS. 3 and 4. The record carrier 14 is taken over a drum 21, which can be rotated by means of a motor 20 and which comprises, for example, the double reproducing heads 18 and 18'. From these reproducing heads, via loop rings 22 (FIG. 4) are taken in known manner the modulation and the carrier frequency at B; they are processed as described above, when the drum 21 rotates while the loop 14' is stationary. It is also possible to cause the record carrier 14 to run off while the drum rotates.

Thus, in accordance with the above teachings, given measuring periods may be chosen or the time coordinates of the measuring processes may be transformed at will.

What is claimed is:

An arrangement for recording and reproducing measuring processes comprising: oscillator means for producing a carrier frequency signal, means for producing an electric signal representative of said measuring process, means for modulating said information signal on said carrier frequency signal to produce a modulated carrier signal, an amplifier having two selectively operable inputs and one output, said modulated carrier signal being applied to one of said amplifier inputs, switch means for selectively applying the output of said amplifier to a bridge demodulator and to means for recording said modulated carrier signal on one track of a magnetic record carrier, means for recording said carrier signal on a separate track of said record carrier, said signals being recorded simultaneously and in their initial phase relationship, means for reproducing from said record carrier a reproduced carrier signal and a reproduced modulated carrier signal, switch means for selectively synchronizing the oscillator with said reproduced carirer signal, the reproduced modulated carrier signal being applied to the second of said amplifier inputs, the output of said oscillator and the output of said amplifier being applied to opposite ends of said bridge demodulator, and means for deriving said information signal from said demodulator.

References Cited in the file of this patent

UNITED STATES PATENTS

| | | |
|---|---|---|
| 2,334,510 | Roberts | Nov. 16, 1943 |
| 2,349,886 | Roberts | May 30, 1944 |
| 2,661,397 | Berens et al. | Dec. 1, 1953 |
| 2,697,754 | Ranger | Dec. 21, 1954 |
| 2,813,927 | Johnson | Nov. 19, 1957 |
| 2,867,685 | Johnson | Jan. 6, 1959 |
| 2,924,967 | Gieseler | Feb. 16, 1960 |